United States Patent Office 2,915,501
Patented Dec. 1, 1959

2,915,501

COPOLYMERS OF MONONUCLEAR PHENOLS AND 3,9-DIALKENYLSPIROBI (M-DIOXANES)

Howard R. Guest, Charleston, Joe T. Adams, St. Albans, and Ben W. Kiff, Ona, W. Va., assignors to Union Carbide Corporation, a corporation of New York No Drawing. Application December 27, 1956
Serial No. 630,766

14 Claims. (Cl. 260—47)

This invention relates to a new class of resins derived from phenols.

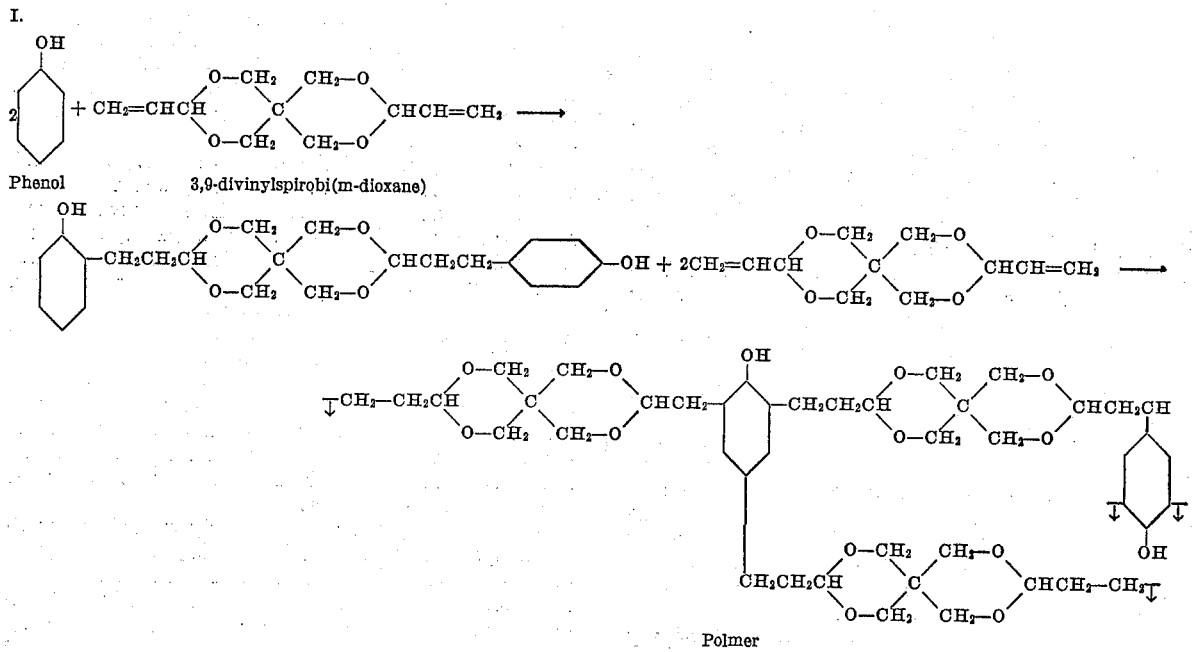

The classic phenolic resins are based on condensation products of phenol and formaldehyde. Such resins are usually made in two stages; the first stage being a partially condensed resin which further polymerizes during the molding cycle to form the familiar molded articles of commerce. As gases are released during such molding cycles, high molding pressures are required. Also molded articles of phenolic resin are somewhat brittle and lacking in resistance to impact.

We have discovered a new class of resins derived from phenols which cure without the release of gases to form hard and tough polymers. According to this invention such polymers are made by condensing a mononuclear phenol with an unsaturated acetal. The unsaturated acetals may be formed by the reaction of acrolein or substituted acroleins with pentaerythritol. Such unsaturated acetals may be represented by the formula:

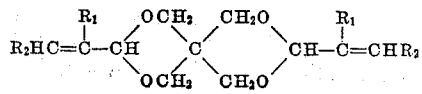

where $R_1$ is hydrogen, methyl or chlorine, and $R_2$ is hydrogen or methyl.

The unsaturated acetal from acrolein and pentaerythritol, termed diallylidene pentaerythritol or 3,9-divinylspirobi(m-dioxane), is known to enter into resinification reactions with polyhydric alcohols in the presence of acidic catalysts. Such reactions proceed by the sequential addition of the vinyl groups of the acetal to the hydroxyl groups of the polyhydric alcohols to form a polyether.

Unlike these known resins, the polymers of the present invention are not polyethers. Instead the phenols copolymerize with the vinyl groups of the acetals by means of the active hydrogen atoms of the phenols in the ortho and para positions. Thus, the reaction mechanism of the present invention may be represented as follows:

It should be noted that the above mechanism suggests the addition of the phenol to the terminal carbon atoms of the vinyl group. It is possible, of course, that the addition follows the rule of Markownikoff whereby the phenol would add to the olefinic carbon atom having the fewest hydrogen atoms, or in this instance the penultimate carbon atom of the acetal.

Regardless of the mode of the addition, all the available evidence indicates that the reaction between the phenols and the unsaturated acetals proceeds by the addition of the phenol at the reactive ortho and para positions to the vinyl group of the acetal.

In the first place, the unsaturated acetal does react with phenol to form a three-dimensional, thermosetting polymer network, which indicates that phenol functions as a trifunctional reactant, at least to a significant extent. In the second place, the mode of reaction represented by Equation I indicates a stoichiometric reaction between two moles of phenol and three moles of the spirobi compound; and it has been found experimentally that this is the optimum reactant ratio for the preparation of thermosetting polymers. If the stoichiometric ratio is departed from appreciably, the resulting product displays considerable thermoplasticity at 150° C. In the third place, it was shown by means of a suitable chemical test for phenolic hydroxyl groups that the concentration of phenolic hydroxyl remains substantially undiminished during the course of the reaction. The chemical test used involves the reaction of a phenol with diazotized sulfanilic acid to form an intensely colored orange solution. The color intensity is proportional to the concentration of phenolic hydroxyl present in the unknown.

As indicated above, the optimum molar ratio of phenol to 3,9-divinylspirobi(m-dioxane) is 2 to 3, since the phenol is trifunctional in that it has three active hydrogen atoms, and the acetal is bifunctional by virtue of the two vinyl groups. However, useful cured resins can be obtained in reactant ratios varying from 0.25 to 4, and preferably from 0.75 to 1.25, equivalents of a mononuclear phenol per equivalent weight of the dialkenylspirobi(m-dioxane). The equivalent weight of a mononuclear phenol is its molecular weight divided by its functionality, and its functionality is the number of unsubstituted positions ortho or para to a phenolic hydroxyl group. There must be at least two such reactive positions open in the molecule for resinification to occur, and, in a mixture of phenols, an average of at least two such reactive positions. The equivalent weight of the spirobi acetal is one-half its molecular weight.

The resinification reaction between the monohydric phenols and the divinylspirobi(m-dioxane) is catalyzed by acids or acid-reacting substances. Effective catalysts include strong acids, such as toluenesulfonic, benzenesulfonic, or sulfuric acids; and acid-reacting materials, such as diethyl sulfate. Less effective catalysts include weaker acids, such as phosphoric acid, or Lewis acids (electron accepting compounds), such as aluminum chloride, stannic chloride, ferric chloride, zinc chloride or titanium tetrachloride. As little as 0.1% acid, based on both reactants, will catalyze the initial reaction between the phenol and the unsaturated acetal. However, the curing or hardening of the resin is accelerated by higher acid concentrations, of around 0.3%. Thus, the amount of acid may be varied, and suitable amounts include the range of from 0.01% to 2%.

Reaction between the phenols and the unsaturated acetals may be initiated by simply mixing the reactants and catalysts and heating. Reaction temperatures may be 50° C. to 150° C., with the reaction time varying from about one hour at the lower temperature to a few minutes at the higher temperature. If desired, an inert diluent, such as an ether or a hydrocarbon may be used to facilitate handling the reaction mixture.

The initial reaction product, after removal of any inert diluent, is a heat-hardenable, fusible material, varying from a viscous liquid to a low-melting solid. If allowed to stand at room temperature without neutralization of the catalyst, the material will eventually cure to a hard polymer. The curing reaction is accelerated by heating; a few hours being required at 70° C., and a few minutes at 150° C. The physical properties of the polymer, such as the heat distortion values, are improved by curing at the higher temperatures. Usually, therefore, the curing temperature will be higher than the initial reaction temperature. If the catalyst is neutralized with a base, such as sodium carbonate, calcium carbonate or sodium acetate, the resin will remain in the fusible state on standing. The neutralized fusible resins may be cured by adding additional acid and heating in the same manner. As previously stated, no gases are released during the curing cycle.

Any of the mononuclear phenols having at least two reactive positions are suitable for the reaction of this invention, such as phenol, mixed cresols, m-xylenol, p-phenylphenol, p-t-butylphenol, beta-naphthol, or mixtures of phenols from coal tar or coal hydrogenation fractions. Substituted phenols, such as chlorophenols may also be used. Mononuclear polyhydric phenols may also be used, such as resorcinol, hydroquinone and phloroglucinol. A mononuclear phenol may be defined as a phenol in which the phenolic hydroxyl groups are all attached to the same aromatic ring.

In addition to the 3,9-divinylspirobi(m-dioxane), which is preferred, the following unsaturated acetals may also be used.

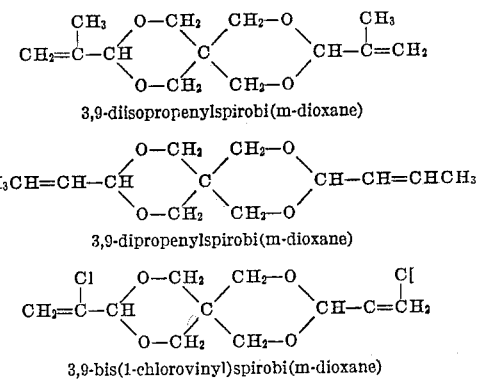

3,9-diisopropenylspirobi(m-dioxane)

3,9-dipropenylspirobi(m-dioxane)

3,9-bis(1-chlorovinyl)spirobi(m-dioxane)

The cured resins from the mononuclear phenol and 3,9-divinylspirobi(m-dioxane) are bubble-free and in the absence of fillers usually translucent to transparent. After curing, the resins are thermoset, insoluble and infusible. Shrinkage, on molding, is low and the molded pieces are tough, impact-resistant and easy to machine. If cured in contact with glass, a good resin to glass bond is obtained.

Such copolymers of the diakenylspirobi(m-dioxane) and phenols are useful in shell molding and as a binder for abrasive particles in making grinding wheels. Their adherence to glass indicates utility in making laminates from glass fiber and glass fabric. The fact that no water or other volatile by-product is liberated during curing gives the copolymers of this invention a decided advantage over conventional phenolic resins in potting, encapsulating and casting applications. In general, these new resins can be used in many of the applications now served by conventional phenolic, epoxy or polyester resins. The electrical properties of the new copolymers are superior to those of conventional unfilled phenolic resins, and are superior in some respects to electrical grade mica-filled phenolics.

The new copolymers are particularly valuable as molding compositions, and the fact that they release no gases or fumes on molding gives them a pronounced advantage over the conventional novolac resin cured with hexamethylenetetramine, enabling low pressure molding techniques to be employed and insuring the formation of bubble-free molded articles. Various fillers, such as wood flour, diatomaceous earth, and asbestos may be used. Also, in such applications, particularly where iron, aluminum or other metal fillers are employed, it is desirable to mix in the composition a catalyst of a special type, which releases its acid at molding temperatures. In this manner stable molding compositions may be prepared. Such catalysts are the dialkyl sulfates, such as dimethyl, diethyl, diisopropyl and di-secondary butyl sulfates. These catalysts decompose at molding temperatures to release sulfuric acid which is the active catalyst.

Immersion tests on the new resins show that they have good resistance to attack by a variety of corrosive chemicals. A typical phenol-divinylspirobi(m-dioxane) copolymer showed a weight gain of only 0.44 percent after immersion in 30% aqueous sulfuric acid for seven days at room temperature. In similar seven-day immersion tests at room temperature, the same resin gained only 0.65% in 1% sodium hydroxide, 0.72% in 10% ammonium hydroxide solution, and 0.81% in water. A sample subjected to a two-hour immersion in boiling 5% sulfuric acid gained only 0.78%.

The following examples will serve to illustrate the invention:

EXAMPLE I

A charge of 106 grams (0.5 mole) of 3,9-divinylspirobi(m-dioxane), 31 grams (0.33 mole) of phenol, one gram of toluenesulfonic acid and 150 ml. of butyl ether was placed in a one-liter reaction flask. While the mixture was stirred, it was heated at 70° C. for one hour. At the conclusion of that time it was transferred to a distilling flask and the solvent was stripped off to a kettle temperature of 83° C./5 mm. Films of this material were cast on steel plates and were cured at 100° C. The films were hard and of excellent quality.

Part of the resin was poured into molds and cured at 100° C. for 16 hours. The bars had these properties:

| Property | Test Procedure | |
|---|---|---|
| Heat distortion | ASTM No. D-648-45T | 72° C. |
| Impact (Izod) (Ft.-lbs. per in. of notch). | ASTM No. D-256-47T | 0.61. |
| Hardness (Durometer "D") | | 84. |

EXAMPLE II

A charge of 106 grams of 3,9-divinylspirobi(m-dioxane) (0.5 mole), 16 grams phenol (0.17 mole), one gram toluene-sulfonic acid, and 150 ml. of isopropyl ether was placed in a one-liter reaction flask. While the mixture was stirred it was heated at 75° C. for one hour. It was transferred to a distillation flask and the solvent was stripped off to a kettle temperature of 84° C./7 mm. Films of the resin were cast on steel plates and were of good quality after curing at 100° C. Part of the resin was poured into molds and cured at 100° C. for 16 hours. The bars thus formed had these properties:

Heat distortion _____°C__ 75
Impact (Izod) (ft.-lbs. per in. of notch)_____ 0.41
Hardness (Durometer "D") _____ 86

EXAMPLE III

A charge of 106 grams of 3,9-divinylspirobi(m-dioxane) (0.5 mole), 8 grams of phenol (0.085 mole), one gram of toluenesulfonic acid and 150 ml. isopropyl ether was placed in a one-liter reaction flask. While the mixture was stirred it was heated at 75° C. for one hour. After stripping off the solvent to a kettle temperature of 81° C./4 mm. films were cast on steel plates. They were moderately hard after 3 hours at 100° C. Part of the resin was poured into molds and cured for 16 hours at 100° C. Properties of the cured bars were:

Heat distortion _____°C__ 34
Impact (Izod) (ft.-lbs. per in. of notch)_____ 0.18
Hardness (Durometer "D") _____ 74

EXAMPLE IV

A charge of 106 grams of 3,9-divinylspirobi(m-dioxane) (0.5 mole), 94 grams of phenol (1 mole), one gram of toluenesulfonic acid, and 200 grams of xylene were placed in a one-liter reaction flask. While the mixture was stirred it was heated for one hour at 70° C. The solvent was then distilled off to a kettle temperature 70° C./8 mm. Thin films of the resin were cast on glass and steel surfaces. After curing at 100° C. for 16 hours they were very hard, but somewhat brittle. Part of the resin was poured into molds and cured for 16 hours at 100° C. Bars produced in this manner were very hard but were also brittle.

EXAMPLE V

A charge of 106 grams of 3,9-divinylspirobi(m-dioxane) (0.5 mole), 40 grams of "meta-phenols,"[1] one gram of toluenesulfonic acid and 150 ml. isopropyl ether was placed in a one-liter reaction flask. The mixture was heated for one hour at 74° C. The solvent was distilled off to a kettle temperature of 80° C./10 mm.

Samples of the resin were cured for three hours at 100° C. The material was hard but somewhat brittle.

EXAMPLE VI

A charge of 318 grams of 3,9-divinylspirobi(m-dioxane) (1.5 moles), 94 grams phenol (1 mole) and 0.4 gram mixed alkanesulfonic acid were charged to a reaction flask and reacted for 15 minutes at 120–135° C.

To 370 grams of this resin there was added an additional 0.88 gram of alkanesulfonic acid. The material was poured into molds. One bar cured for 15 minutes at 150° C. had the following properties:

Heat distortion _____°C__ 96
Impact strength (Izod) (ft.-lbs. per in. of notch)___ 0.4
Hardness (Durometer "D") _____ 85

Another bar cured 30 minutes at 150° C. had these properties:

Heat distortion _____°C__ 122
Impact (Izod) (ft.-lbs. per in. of notch) _____ 0.2
Hardness (Durometer "D") _____ 88

Another bar cured 45 minutes at 150° C. had these properties:

Heat distortion _____°C__ 127
Impact (Izod) (ft.-lbs. per in. of notch)_____ 0.3
Hardness (Durometer "D") _____ 87

[1] The "meta-phenols" used in this experiment were a commercial mixture which contained the following:

| | Percent |
|---|---|
| 3,5-xylenol | 11 |
| m-Ethylphenol | 15 |
| m-Cresol | 8 |
| 3,4-xylenol | 7 |
| 2,5-xylenol | 5 |
| 2,3-xylenol | 3 |
| o-Ethylphenol | 2 |
| p-Ethylphenol | 10 |
| p-Cresol | 5 |
| 2,4-xylenol | 6 |
| Higher mono-phenols | 29 |
| Non-phenolic hydrocarbons | 2 |

EXAMPLE VII

A solution of 240 grams (1.0 mole) of 3,9-diisopropenylspirobi(m-dioxane) and 63 grams (0.66 mole) of phenol was prepared at 75° C. and 0.3 gram of mixed alkanesulfonic acid was added dropwise to catalyze the reaction. The reaction mixture was heated to 125° C. for 35 minutes, 0.5 gram of mixed alkanesulfonic acids added, and then cast in bar molds. The castings were cured at 150° C. for 45 minutes and the resulting product was a dark-colored hard resin.

EXAMPLE VIII

A mixture of 100 grams (0.356 mole) of 3,9-bis-(1-chlorovinyl)spirobi(m-dioxane) and 22 grams (0.235 mole) of phenol was heated to 85° C. and 0.127 gram of mixed alkanesulfonic acids was added. After heating for 20 minutes at 135° C., the mixture became dark red and viscous. Additional mixed alkanesulfonic acids (0.29 gram) were added and the mixture was cured in an oven at 150° C. for 70 minutes. The cured resin was hard and brittle.

EXAMPLE IX 3,9-dipropenylspirobi(m-dioxane) (171 grams, 0.212 mole), phenol (44 grams, 0.468 mole) and mixed alkanesulfonic acids (0.215 gram) were heated at 132° C. for two hours. The mixture was then cooled to 80° C. and 0.44 gram of mixed alkanesulfonic acids was stirred into the viscous liquid. The resin was then cast in bar molds and cured at 150° C. for 2½ hours. The product was a dark brown resin that was hard and brittle.

EXAMPLE X 19.0 parts by weight of phenol (0.2 mole) was reacted with 63.6 parts 3,9-divinylspirobi(m-dioxane) (0.3 mole)

in the presence of 0.25 part p-toluenesulfonic acid monohydrate as a catalyst. In carrying out this reaction the sulfonic acid catalyst was first dissolved in the melted phenol in a beaker and the spirobi was then gradually added while cooling to remove heat from this very rapid, exothermic reaction and to keep the temperature of the reaction mass below about 60° C. The liquid product formed in this way attained a honey-like viscosity after standing for about 10 minutes at room temperature. Its gel time was 60 seconds on the 160° C. hot plate. A small (approximately 5 gram) sample was cured in a test tube for 15 minutes at 150° C. The cured product was a transparent, amber, thermoset material which was hard and rigid at 150° C. It was less brittle than a conventional phenolic resin and adhered very strongly to glass. No gas was evolved during the cure and no bubbles appeared in the cured casting.

A portion of a glass stirring rod that had been imbedded in the cured polymer was almost invisible. This indicates that the polymer has approximately the same refractive index as glass and that a glass-reinforced laminate of the material would have high transparency. The specific gravity of this polymer was only 1.229. This is quite low when compared with the range for conventional phenolic casting resins, which is 1.325 to 1.335. The low specific gravity is an advantage in aircraft and similar applications where weight must be minimized. It is also an economic advantage to the molder of the material who obtains a larger molded volume for a given price per pound.

EXAMPLE XI 19.0 parts of phenol plus 63.6 parts of 3,9-divinylspirobi(m-dioxane) and 0.037 part of concentrated sulfuric acid were stirred together in the sequence described in Example X while heating on the steam bath. Temperature of the reaction was maintained at about 80° C. during the addition of the spirobi compound. The clear liquid product became more viscous after about ten minutes indicating that reaction had occurred. Approximately ¼ inch deep layers of this viscous liquid were poured into approximately 2" diameter round shallow pans and cured in a 150° C. oven for 20 minutes. The resulting polymer was light amber, transparent, and contained no bubbles. Its specific gravity was 1.231. It was hard and solid at 150° C., indicating a rather high heat distortion temperature. After cooling to room temperature, the cured resin had a Barcol Hardness of 34 (measured with a Barcol Impressor, Barber Colman Co. of Rockford, Ill.).

After seven day room temperature immersion tests, the cured material showed an 0.81 percent weight gain in water, an 0.44 percent weight gain in 30 percent aqueous sulfuric acid, an 0.65 percent gain in one percent aqueous sodium hydroxide, and an 0.72 percent weight gain in 10 percent aqueous ammonium hydroxide. For comparative purposes, similar tests on cast, unfilled samples of polester resin A[1] showed a weight gain of 1.67 percent in 10 percent ammonium hydroxide, 0.23 percent in water, 0.14 percent in 30 percent sulfuric acid, and 0.25 percent in 1 percent sodium hydroxide. A typical cured epoxy resin, a diglycidyl ether of bisphenol-A, hardened with a stoichiometric proportion of a 2:1 acrylonitrile:diethylenetriamine adduct, as described in A. G. Farnham U.S. Patent No. 2,753,323, showed a weight gain of 4.0 percent in 30% sulfuric acid but a negligible gain in the other liquids.

EXAMPLE XII 19.0 parts of phenol (0.2 mole) was reacted with 63.6 parts of 3,9-divinylspirobi(m-dioxane) (0.3 mole) and 0.256 part (0.31 percent) of a commercial mixture of methyl, ethyl and propyl sulfonic acids marketed by Indoil Chemical Co. (Chicago, Ill.) under the designation "alkane sulfonic acid" in a manner substantially similar to that used in Example X. A liquid product of about the consistency of glycerin was formed. This product had a gel time of 179 seconds at 160° C. Samples were poured into shallow pans and cured in a 150° C. oven for 17 minutes. The polymer was hard and solid at 150° C. It was amber, transparent, and similar to the materials described in the preceding examples. Its specific gravity was 1.238. The Barcol Hardness of the cured polymer was 35.

EXAMPLE XIII

It is sometimes desirable to use a combination of acidic catalysts. For example, 19.0 grams (0.2 mole) phenol was reacted with 63.6 grams (0.3 mole) of 3,9-divinylspirobi-(m-dioxane) and 0.84 grams (1.01 percent) phosphoric acid plus 0.04 gram (0.048 percent) "alkane sulfonic acid" as described in Example XII. This mixture was heated on the steam bath at about 80° C. with stirring for about one hour. The reaction product was a viscous liquid. Samples were cast and cured 30 minutes at 150° C. The cured products were solid at 150° C. and similar in properties to the materials described in the preceding examples. The specific gravity of the cured material was 1.223. The Barcol Hardness was 38.

EXAMPLE XIV 21.2 grams (0.2 mole) of a mixture of cresols, was reacted with 63.6 grams (0.3 mole) of 3,9-divinylspirobi-(m-dioxane) compound plus 0.23 gram (0.29 percent) of p-toluenesulfonic acid monohydrate. A fast reaction occurred on the steam bath to produce a viscous, transparent product in about 5 minutes. This was cast and cured 85 minutes at 150° C. to produce a hard, transparent, amber solid. The specific gravity of the polymer was 1.211. The Barcol Hardness was 31.

EXAMPLE XV 24.4 grams (0.2 mole) of meta-xylenol was reacted with 63.6 grams (0.3 mole) of 3,9-divinylspirobi(m-dioxane) plus 0.060 gram (0.068 percent) of p-toluenesulfonic acid monohydrate on the steam bath for about 5 minutes. A sample of the viscous liquid so prepared was cast and cured 70 minutes in the 150° C. oven to produce a light yellow, transparent product that was hard and solid at 150° C. The specific gravity of this product was only 1.199. The Barcol Hardness was 31.

EXAMPLE XVI 28.8 grams (0.2 mole) of beta-naphthol was reacted with 63.6 grams (0.3 mole) of 3,9-divinylspirobi(m-dioxane) plus 0.29 percent by weight of p-toluenesulfonic acid monohydrate for about 1 hour at 80–90° C. The gel time of this reaction product was 700 seconds at 160° C. A cast sample was still rubbery after 3.5 hours in the 150° C. oven, but hardened to a black opaque material on cooling to room temperature.

EXAMPLE XVII

A reaction between 63.6 grams (0.3 mole) of 3,9-divinylspirobi(m-dioxane) and 22.0 grams (0.2 mole) of resorcinol in the presence of a low concentration of catalyst, 0.0049% of p-toluenesulfonic acid, proceeded rapidly. Extensive cooling was required to prevent overheating. Curing the initial reaction product at 150° C. for 7.5 hours produced a material which was soft at 150° C. but hard and brittle at room temperature. When the reaction was repeated at a higher catalyst concentration, 0.013%, the reaction product became thermoset during the initial reaction period.

---

[1] This is a thermosetting polyester resin prepared by mixing 0.7 mole of styrene with the polyester formed from 0.6 mole maleic anhydride, 0.4 mole phthalic anhydride and 1.1 moles propylene glycol.

EXAMPLE XVIII

In the potting or encapsulating of metal parts it is undesirable to use strongly acidic catalysts; and latent catalysts are preferred. Diethyl sulfate is illustrative of the latent catalysts suitable for these and similar applications. For example, 63.6 grams (0.3 mole) of 3,9-divinylspirobi(m-dioxane) was reacted with 19.0 grams (0.2 mole) phenol and 0.154 gram (0.19 percent) diethyl sulfate on the steam bath at about 80° C. for about 15 minutes. An iron nail with a freshly filed surface was immersed in the liquid product so prepared and allowed to stand for one week with no sign of corrosive attack on the nail or tarnishing of its shiny surface. A sample of the liquid product was also cast and cured around an iron nail. Curing time to hardness at 150° C. was 20 minutes. The iron of the nail had no inhibiting effect on the cure. Also there was no tarnishing of the shiny surface of the nail and no cracking or faults in the cured resin casting around the nail.

EXAMPLE XIX

If desired, the phenol may be added during the preparation of an A-stage resin from acrolein and pentaerythritol.

Thus, a charge of 230 grams of 95.8% acrolein (3.93 moles), 255 grams pentaerythritol (1.87 mole) and 22 grams of phenol was placed in a reaction flask with 0.96 gram of sulfuric acid catalyst dissolved in 2 cc. water. The amount of phenol added was 5% based on the total weight of the finished resin. The mixture was reacted for 30 minutes at 74° C. Volatile matter was then distilled off to a kettle temperature of 73° C./10 mm. The A-stage material thus produced was poured into molds and cured for 3 hours at 100° C. One sample was tested and had these properties:

Heat distortion _____ ° C__ 84
Flexural modulus _____ p.s.i__ 425,000
Impact strength (Izod) (ft.-lbs. per in. of notch) 1.49
Hardness (Durometer "D") _____ 82

EXAMPLE XX

A series of resins were prepared for comparative testing of physical properties:

(A) *Example of A-stage resin prepared and cured with sulfuric acid*

A charge of 119 grams of 97.9% acrolein, 170 grams pentaerythritol and 0.58 gram sulfuric acid in 1 cc. of water was placed in a reaction flask and heated at 73–75° C. for 30 minutes. At the end of that time the volatile material was stripped off to a kettle temperature of 83° C./4.5 mm. A portion of this A-stage material was cured by heating 16 hours at 100° C. and had these properties:

Heat distortion _____ ° C__ 103
Flexural modulus _____ p.s.i__ 346,000
Hardness (Durometer "D") _____ 85

(B) *Example of resin prepared from 1.5 moles 3,9-divinylspirobi(m-dioxane) and 1 mole phenol*

A charge of 135 grams of 3,9-divinylspirobi(m-dioxane) (0.636 mole), 40 grams of phenol (0.426 mole) and 0.522 gram diethyl sulfate was heated at 50 minutes at 100 to 128° C. The material was poured into molds and cured at 150° C. for 16 hours. A cured sample had these properties:

Heat distortion _____ ° C__ 144
Hardness (Durometer "D") _____ 88
Flexural modulus _____ p.s.i__ 413,000

(C) *Example of resin prepared from 2 moles 3,9-divinylspirobi(m-dioxane) to 1 mole of phenol*

A charge of 135 grams of 3,9-divinylspirobi(m-dioxane) (0.638 mole), 30 grams phenol (0.319 mole), and 0.51 gram diethyl sulfate was heated for 75 minutes at 117° C. to 128° C. The product was poured into molds nad cured for 16 hours at 150° C. One sample was tested and had these properties:

Heat distortion _____ ° C__ 133
Flexural modulus _____ p.s.i__ 407,000
Hardness (Durometer "D") _____ 88

(D) *Example of epoxy resin from commercial source*

A commercial epoxy resin, Marblette 616 from the Marblette Corporation, Long Island City, N.Y., was cured using the amine hardener furnished with the resin. The curing step required 6 hours at 100° C.

Samples of the cured resins were tested for resistance to boiling water and for heat stability. The test results follow:

| Resin | Increase in Weight After Two Hours in Boiling Water, percent | Loss in Weight After Six Hours at Indicated Temperature |
|---|---|---|
| A | 2.21 | |
| B | 0.75 | 0.04% at 150° C. |
| C | 0.57 | 0.04% at 150° C. |
| D | 1.01 | 0.32% at 100° C. |

What is claimed is:

1. A resinous heat reaction product of from 0.25 to 4 equivalents of a mononuclear phenol and one equivalent of a 3,9-dialkenylspirobi(m-dioxane) having from 2 to 3 carbon atoms in the alkenyl radical and having the double bond of the alkenyl radical in the alpha position.

2. A resinous heat reaction product of from 0.25 to 4 equivalents of a mononuclear phenol and one equivalent of 3,9-diisopropenylspirobi(m-dioxane).

3. A resinous heat reaction product of from 0.25 to 4 equivalents of a mononuclear phenol and one equivalent of 3,9-dipropenylspirobi(m-dioxane).

4. A resinous heat reaction product of from 0.25 to 4 equivalents of a mononuclear phenol and one equivalent of 3,9-bis(1-chlorovinyl)spirobi(m-dioxane).

5. A resinous heat reaction product of from 0.25 to 4 equivalents of a mononuclear phenol and one equivalent of 3,9-divinylspirobi(m-dioxane).

6. A resinous heat reaction product of from 0.25 to 4 equivalents of phenol and one equivalent of 3,9-divinylspirobi(m-dioxane).

7. A resinous heat reaction product of from 0.25 to 4 equivalents of an alkyl-substituted phenol and one equivalent of 3,9-divinylspirobi(m-dioxane).

8. Process for making a thermoset resin which comprises heating at a reaction temperature of 50° C. to 150° C. and in admixture with an acid catalyst, from 0.25 to 4 equivalents of a mononuclear phenol and one equivalent of a 3,9-dialkenylspirobi(m-dioxane) having from 2 to 3 carbon atoms in the alkenyl radical and having the double bond of the alkenyl radical in the alpha position to form a fusible, heat-hardenable resin, and heating the fusible, heat-hardenable resin at a temperature higher than said reaction temperature to form a solid thermoset resin.

9. Process for making a thermoset resin which comprises heating at a reaction temperature of 50° C. to 150° C. and in admixture with an acid catalyst, from 0.25 to 4 equivalents of phenol and one equivalent of 3,9-divinylspirobi(m-dioxane) to form a fusible, heat-hardenable resin, and heating the fusible, heat-hardenable resin at a temperature higher than said reaction temperature to form a solid thermoset resin.

10. A fusible, heat-hardenable composition of matter comprising the heat reaction product of from 0.25 to 4 equivalents of a mononuclear phenol and one equivalent of a 3,9-dialkenylspirobi(m-dioxane) having from 2 to 3 carbon atoms in the alkenyl radical and having the double bond of the alkenyl radical in the alpha position, in combination with an acid catalyst.

11. A fusible, heat-hardenable composition of matter comprising the heat reaction product of from 0.75 to 1.25 equivalents of phenol and one equivalent of 3,9-divinylspirobi(m-dioxane), in combination with an acid catalyst.

12. A fusible, heat-hardenable composition of matter comprising the heat reaction product of from 0.75 to 1.25 equivalents of phenol and one equivalent of 3,9-divinylspirobi(m-dioxane), in combination with diethyl sulfate.

13. Process for making fusible, heat-hardenable resins which comprises heating at reaction temperatures of from 50° C. to 150° C. and in admixture with an acid catalyst from 0.25 to 4 equivalents of a mononuclear phenol with one equivalent of a 3,9-dialkenylspirobi(m-dioxane) having from 2 to 3 carbon atoms in the alkenyl radical and having the double bond of the alkenyl radical in the alpha position.

14. Process for making fusible, heat-hardenable resins which comprises heating at reaction temperatures of from 50° to 150° C. and in admixture with an acid catalyst from 0.75 to 1.25 equivalents of phenol with one equivalent of 3,9-divinylspirobi(m-dioxane).

References Cited in the file of this patent

UNITED STATES PATENTS 2,401,776    Rothrock _____ June 11, 1946

FOREIGN PATENTS 868,351    Germany _____ Feb. 23, 1953